US011935373B2

(12) United States Patent
Nabeto et al.

(10) Patent No.: US 11,935,373 B2
(45) Date of Patent: Mar. 19, 2024

(54) PROCESSING SYSTEM, PROCESSING METHOD, AND NON-TRANSITORY STORAGE MEDIUM

(71) Applicant: NEC Corporation, Tokyo (JP)

(72) Inventors: Yu Nabeto, Tokyo (JP); Soma Shiraishi, Tokyo (JP); Takami Sato, Tokyo (JP); Katsumi Kikuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/924,738

(22) PCT Filed: May 20, 2020

(86) PCT No.: PCT/JP2020/019900
§ 371 (c)(1),
(2) Date: Nov. 11, 2022

(87) PCT Pub. No.: WO2021/234842
PCT Pub. Date: Nov. 25, 2021

(65) Prior Publication Data
US 2023/0186736 A1 Jun. 15, 2023

(51) Int. Cl.
*G07G 1/00* (2006.01)
*G06Q 20/20* (2012.01)
*G06V 10/74* (2022.01)

(52) U.S. Cl.
CPC ......... *G07G 1/0045* (2013.01); *G06Q 20/208* (2013.01); *G06V 10/761* (2022.01); *G06V 2201/07* (2022.01)

(58) Field of Classification Search
CPC .. G07G 1/0045; G06V 10/761; G06Q 20/208; G06Q 20/20

(Continued)

(56) References Cited

U.S. PATENT DOCUMENTS

| 2016/0086149 | A1 | 3/2016 | Yuyama | |
| 2020/0033842 | A1* | 1/2020 | Masuda | G05B 19/4183 |
| 2023/0050451 | A1* | 2/2023 | Tateno | G06Q 30/0241 |

FOREIGN PATENT DOCUMENTS

| JP | H11-306288 A | 11/1999 |
| JP | 2015-187870 A | 10/2015 |

(Continued)

OTHER PUBLICATIONS

International Search Report for PCT Application No. PCT/JP2020/019900, dated Jul. 21, 2020.

(Continued)

*Primary Examiner* — Edwyn Labaze
(74) *Attorney, Agent, or Firm* — Sughrue Mion, PLLC

(57) ABSTRACT

An image acquisition unit (11) acquires a recognition processing image. A recognition unit (12) recognizes a product in the recognition processing image based on an estimation model. A registration unit (13) registers a result of the recognition in recognized product information. An output unit (14) outputs a result of the recognition. A correction reception unit (16) receives an input for correcting a result of the recognition. A correction unit (17) changes a result of the recognition to a result of the recognition after a correction, and also stores correction information in which a result of the recognition after a correction and the recognition processing image are associated with each other. A learning unit (18) performs relearning by using the recognition processing image stored as the correction information and updates the estimation model, when a number of the recognition processing image stored exceeds a predetermined value.

9 Claims, 11 Drawing Sheets

(58) Field of Classification Search
USPC .................................. 235/383, 375, 487, 376
See application file for complete search history.

(56) References Cited

FOREIGN PATENT DOCUMENTS

| JP | 2016-062545 A | 4/2016 |
| JP | 2016-143354 A | 8/2016 |
| JP | 6653813 B1 | 2/2020 |
| JP | 2020-061044 A | 4/2020 |
| WO | 2019/167272 A1 | 9/2019 |

OTHER PUBLICATIONS

Kikuchi Katsumi, Shiraishi Soma, Sato Takami, Nabeto Yu, Iwamoto Kouta, Miyano Hiroyoshi, "Heterogeneous Object Recognition to Identify Retail Products", NEC Technical Journal, vol. 72 No. 1, 2019 [online]. [Searched on Apr. 27, 2020], the Internet <URL:https://jpn.nec.com/techrep/journal/g19/n01/190118.html>.

JP Office Action for JP Application No. 2022-524744, dated Aug. 29, 2023 with English Translation.

\* cited by examiner

FIG. 5

RECOGNIZED PRODUCT INFORMATION

| SERIAL NUMBER | PRODUCT CODE | PRODUCT NAME | UNIT PRICE | IMAGE FILE | ... |
|---|---|---|---|---|---|
| 001 | 28172642 | MAINICHI COFFEE | 173 | ****.jpg | .... |
| 002 | 11728194 | SHOWA BAR CHOCOLATE | 127 | ****.jpg | .... |
| .... | .... | .... | .... | .... | .... |

FIG. 6

| No. | PRODUCT NAME | UNIT PRICE | QUANTITY | TOTAL AMOUNT |
|---|---|---|---|---|
| 1 | MAINICHI COFFEE | 173 | 1 | 173 |
| 2 | SHOWA BAR CHOCOLATE | 127 | 1 | 127 |
| 3 | | | | |
| | | | | |

| STOP (CANCEL) | PAY (SETTLE) |
|---|---|

TOUCH WHEN THERE IS PRODUCT YOU WANT TO CORRECT.

FIG. 7

CORRECTION INFORMATION

| PRODUCT CODE | IMAGE FILE | | |
|---|---|---|---|
| | 01 | 02 | ・・・・ |
| 28172642 | ・・・・.jpg | ・・・・.jpg | ・・・・ |
| ⋮ | ⋮ | ⋮ | ⋮ |

US 11,935,373 B2

PROCESSING SYSTEM, PROCESSING METHOD, AND NON-TRANSITORY STORAGE MEDIUM

This application is a National Stage Entry of PCT/JP2020/019900 filed on May 20, 2020, the contents of all of which are incorporated herein by reference, in their entirety.

TECHNICAL FIELD

The present invention relates to a processing system, a processing method, and a program.

BACKGROUND ART

Patent Document 1 discloses a technique for recognizing a product, based on an image in which the product is captured. Non-Patent Document 1 discloses a technique for recognizing heterogeneous objects by combining product recognition by feature point matching with product recognition to which deep learning is applied.

RELATED DOCUMENT

Patent Document

[Patent Document 1] Japanese Patent Application Publication No. 2016-062545

Non Patent Document

[Non-Patent Document 1] "Heterogeneous Object Recognition to Identify Retail Products", [online], [Searched on Apr. 27, 2020], the Internet <URL: https://jpn.nec.com/techrep/journal/g19/n01/190118.html>

DISCLOSURE OF THE INVENTION

Technical Problem

Accuracy of product recognition based on an image is expected to be improved. Thus, the inventors have considered a technique for accumulating, as training data, an image input to an estimation model as an image (image including a product desired to be recognized) being an analysis target during an actual operation at a store and the like, perform relearning by using the training data, and updating the estimation model.

A state of a product (such as an orientation, a shadow, a shape, and a size of a product) in an image being an analysis target changes depending on a capturing environment and the like. In a case of the technique described above, an image that is actually an image being an analysis target during an actual operation at a store and the like can be set as training data, and thus an estimation model suitable for the actual operation at the store and the like is generated by the relearning described above, and accuracy of product recognition during the actual operation at the store and the like improves. Further, since an image input to the estimation model can be accumulated as training data during the actual operation at the store and the like, time and effort for collecting the training data are eliminated.

However, an image input to the estimation model as an image (image including a product desired to be recognized) being an analysis target during the actual operation at the store and the like has an enormous amount even in one day. Furthermore, when the actual operation at the store and the like continues for a long period, an image to be accumulated further swells. When all of the images are used as the training data, a processing load on a computer increases. Further, as a matter of course, a processing load on the computer increases with a higher frequency of the relearning.

The present invention has a challenge to increase accuracy of product recognition based on an image while reducing a processing load on a computer that generates an estimation model.

Solution to Problem

The present invention provides a processing system including:
an image acquisition unit that acquires a recognition processing image including a product being a recognition target;
a recognition unit that recognizes a product in the recognition processing image, based on an estimation model generated by machine learning;
a registration unit that registers a result of the recognition in recognized product information;
an output unit that outputs a result of the recognition;
a correction reception unit that receives an input for correcting a result of the recognition;
a correction unit that changes a result of the recognition being registered in the recognized product information to a result of the recognition after a correction, and also stores, in a storage unit, correction information in which a result of the recognition after a correction and the recognition processing image are associated with each other; and
a learning unit that performs relearning by using the recognition processing image stored as the correction information and updating the estimation model, when a number of the recognition processing image stored as the correction information exceeds a predetermined value.

Further, the present invention provides a processing method including,
by a computer:
acquiring a recognition processing image including a product being a recognition target;
recognizing a product in the recognition processing image, based on an estimation model generated by machine learning;
registering a result of the recognition in recognized product information;
outputting a result of the recognition;
receiving an input for correcting a result of the recognition;
changing a result of the recognition being registered in the recognized product information to a result of the recognition after a correction, and also storing, in a storage unit, correction information in which a result of the recognition after a correction and the recognition processing image are associated with each other; and
performing relearning by using the recognition processing image stored as the correction information and updating the estimation model, when a number of the recognition processing image stored as the correction information exceeds a predetermined value.

Further, the present invention provides a program causing a computer to function as:

an image acquisition unit that acquires a recognition processing image including a product being a recognition target;

a recognition unit that recognizes a product in the recognition processing image, based on an estimation model generated by machine learning;

a registration unit that registers a result of the recognition in recognized product information;

an output unit that outputs a result of the recognition;

a correction reception unit that receives an input for correcting a result of the recognition;

a correction unit that changes a result of the recognition being registered in the recognized product information to a result of the recognition after a correction, and also stores, in a storage unit, correction information in which a result of the recognition after a correction and the recognition processing image are associated with each other; and a learning unit that performs relearning by using the recognition processing image stored as the correction information and updating the estimation model, when a number of the recognition processing image stored as the correction information exceeds a predetermined value.

Advantageous Effects of Invention

The present invention can increase accuracy of product recognition based on an image while reducing a processing load on a computer that generates an estimation model.

BRIEF DESCRIPTION OF THE DRAWINGS

FIG. 5 is a diagram illustrating one example of information processed by the processing system according to the present example embodiment.

FIG. 6 is a diagram illustrating one example of a screen output from the processing system according to the present example embodiment.

FIG. 7 is a diagram illustrating one example of information processed by the processing system according to the present example embodiment.

DESCRIPTION OF EMBODIMENTS

First Example Embodiment

Outline

A processing system according to the present example embodiment accumulates, as training data, only an "image in which a result of recognition is incorrect" among images input to an estimation model as images (images including a product desired to be recognized) being an analysis target during an actual operation at a store and the like. Then, when the number of pieces of the training data accumulated in such a condition exceeds a predetermined value, the processing system performs relearning, based on the training data that have been accumulated, and updates the estimation model. Details will be described below.

Hardware Configuration

Next, one example of a hardware configuration of the processing system will be described.

Each functional unit of the processing system is achieved by any combination of hardware and software concentrating on a central processing unit (CPU) of any computer, a memory, a program loaded into the memory, a storage unit (that can also store a program downloaded from a storage medium such as a compact disc (CD), a server on the Internet, and the like in addition to a program previously stored at a stage of shipping of an apparatus) such as a hard disk that stores the program, and a network connection interface. Then, various modification examples of an achievement method and an apparatus thereof are understood by a person skilled in the art.

Figure 1:
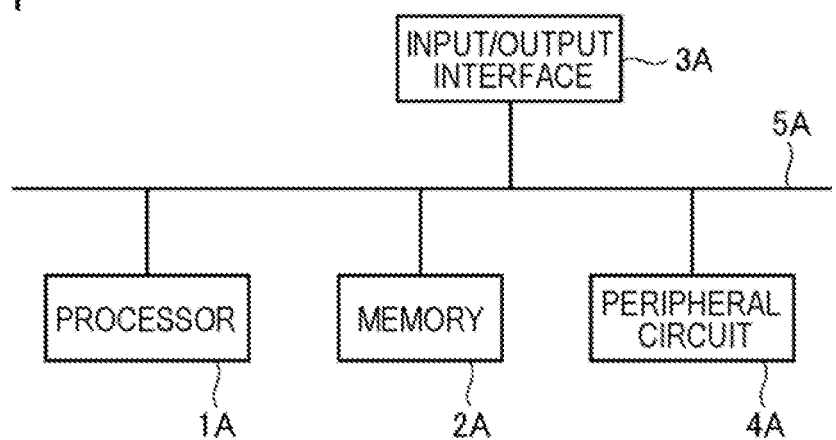
FIG. 1 is a diagram illustrating one example of a hardware configuration of a processing system according to the present example embodiment.

FIG. 1 is a block diagram illustrating a hardware configuration of the processing system. As illustrated in FIG. 1, the processing system includes a processor 1A, a memory 2A, an input/output interface 3A, a peripheral circuit 4A, and a bus 5A. Various modules are included in the peripheral circuit 4A. The processing system may not include the peripheral circuit 4A. Note that, the processing system may be formed of a plurality of apparatuses separated physically and/or logically, or may be formed of one apparatus integrated physically and/or logically. When the processing system is formed of a plurality of apparatuses separated physically and/or logically, each of the plurality of apparatuses can include the hardware configuration described above.

The bus 5A is a data transmission path for the processor 1A, the memory 2A, the peripheral circuit 4A, and the input/output interface 3A to transmit and receive data to and from one another. The processor 1A is an arithmetic processing system such as a CPU and a graphics processing unit (GPU), for example. The memory 2A is a memory such as a random access memory (RAM) and a read only memory (ROM), for example. The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can output an instruction to each of modules, and perform an arithmetic operation, based on an arithmetic result of the modules.

Functional Configuration

Figure 2:
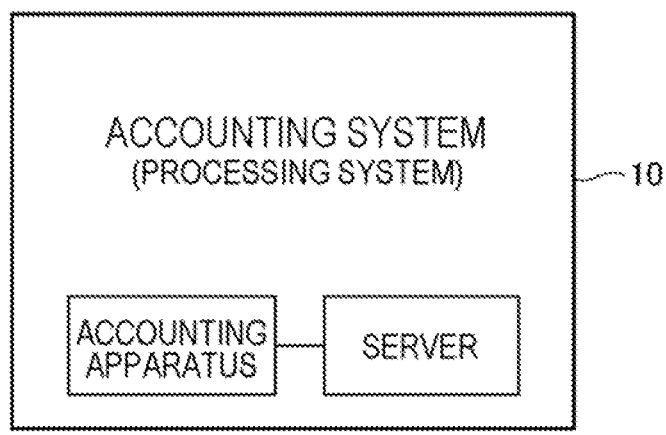
FIG. 2 is one example of a functional block diagram of the processing system according to the present example embodiment.

A processing system 10 according to the present example embodiment is an accounting system as illustrated in FIG. 2. The accounting system includes an accounting apparatus operated by an operator, and a server that communicates with a plurality of the accounting apparatuses. In other words, the processing system 10 includes the accounting apparatus and the server.

The accounting apparatus is an apparatus used when an account is settled at a store, and performs registration processing of registering a product being an accounting target. Note that, the accounting apparatus may further perform settlement processing of settling an accounting amount. The accounting apparatus may be an apparatus assumed to be operated by a salesclerk, and may be an apparatus assumed to be operated by a customer.

In the registration processing, the accounting apparatus acquires product identification information about a product being an accounting target. Subsequently, the accounting apparatus acquires, from a store server or the like, product information (such as a product name, and a unit price) associated with the acquired product identification information, and stores the product information as accounting information in a storage apparatus of the accounting apparatus.

Acquisition of product identification information is achieved by product recognition based on an image. In other words, when the accounting apparatus acquires an image including a product, the accounting apparatus recognizes the product included in the image, and acquires product identification information about the recognized product. Capturing of an image including a product is achieved by an operation by an operator (salesclerk or customer).

In addition, the accounting apparatus may receive an input of product identification information by a known technique via an input apparatus such as a code reader, a touch panel, a physical button, a microphone, a keyboard, and a mouse.

In the settlement processing, the accounting apparatus performs processing of settling an accounting amount. The accounting apparatus can adopt various payment means such as credit card payment, cash payment, point payment, and code payment. Note that, when the accounting apparatus does not perform the settlement processing, the accounting apparatus can transmit registered accounting information (such as information about a product being an accounting target, and an accounting amount) to a settlement apparatus that performs the settlement processing.

Figure 3:
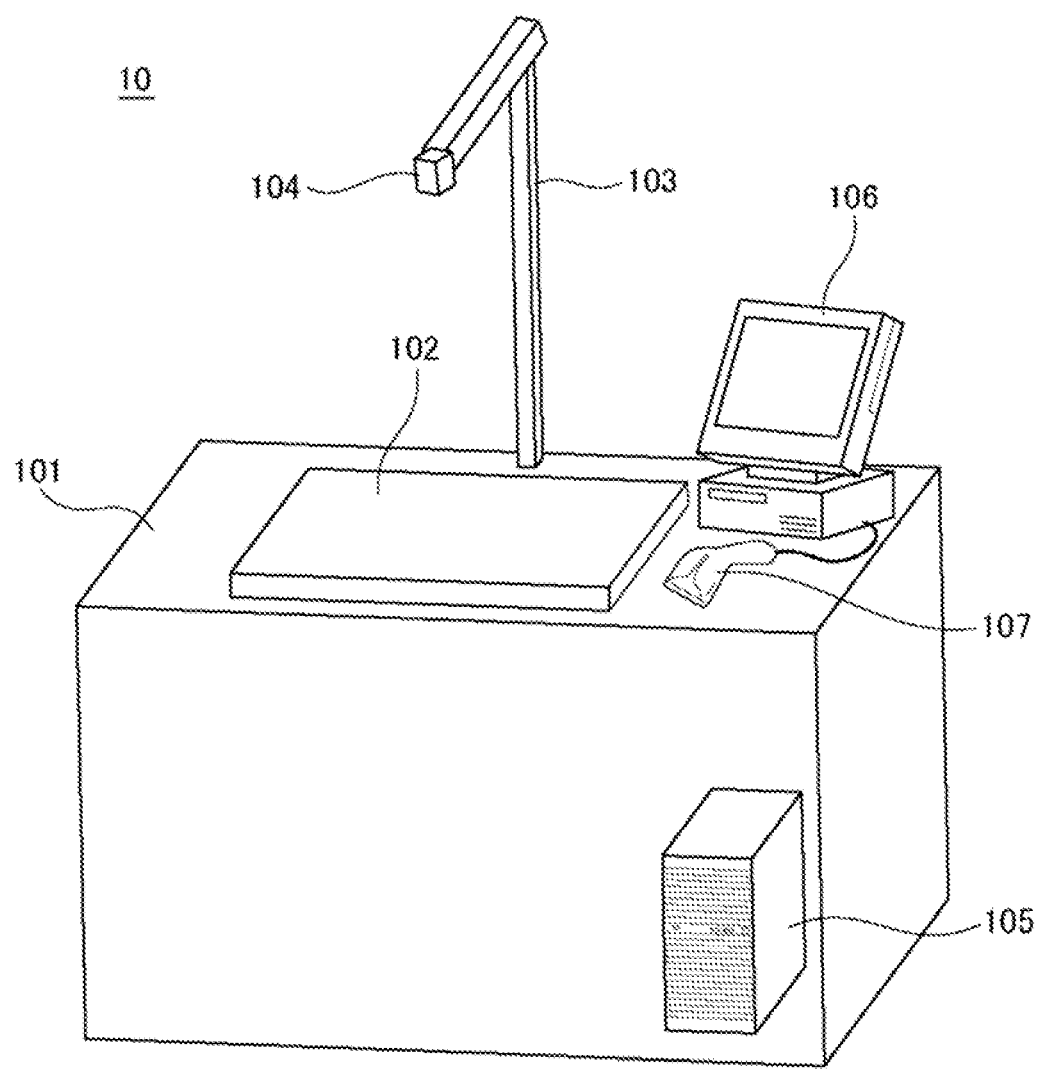
FIG. 3 is a mounting example of an accounting apparatus included in the processing system according to the present example embodiment.

FIG. 3 illustrates a mounting example of the accounting apparatus. Note that, the illustrated mounting example is merely one example, which is not limited thereto. The accounting apparatus includes a pedestal 101, a product placement area 102, a strut 103, a camera 104, a computer 105, a touch panel display 106, and a code reader 107.

An operator places one or a plurality of products being an accounting target in the product placement area 102. A plurality of products can be placed at once on the product placement area 102. The camera 104 is attached to the strut 103 in a position and an orientation in which the product placement area 102 is captured. Such a camera 104 collectively captures one or a plurality of products placed on the product placement area 102.

The camera 104 and the computer 105 can communicate with each other by any means. Then, an image generated by the camera 104 is input to the computer 105 by real time processing. Further, the code reader 107 and the computer 105 can communicate with each other by any means. Then, information acquired by the code reader 107 is input to the computer 105 by real time processing. Further, the touch panel display 106 and the computer 105 can communicate with each other by any means. Then, information acquired by the touch panel display 106 is input to the computer 105 by real time processing. Although not illustrated, the accounting apparatus may include another input apparatus such as a microphone, a physical button, a keyboard, and a mouse. The input apparatus and the computer 105 can communicate with each other by any means. Then, information acquired by the input apparatus is input to the computer 105 by real time processing.

The computer 105 performs various types of processing, based on acquired information. Then, the computer can display a result of the processing on the touch panel display 106.

Note that, the accounting apparatus in this mounting example is configured to collectively capture a plurality of products, but, as a modification example, the accounting apparatus may be configured to capture products one by one when an operator locates the products one by one in front of the camera.

Figure 4:
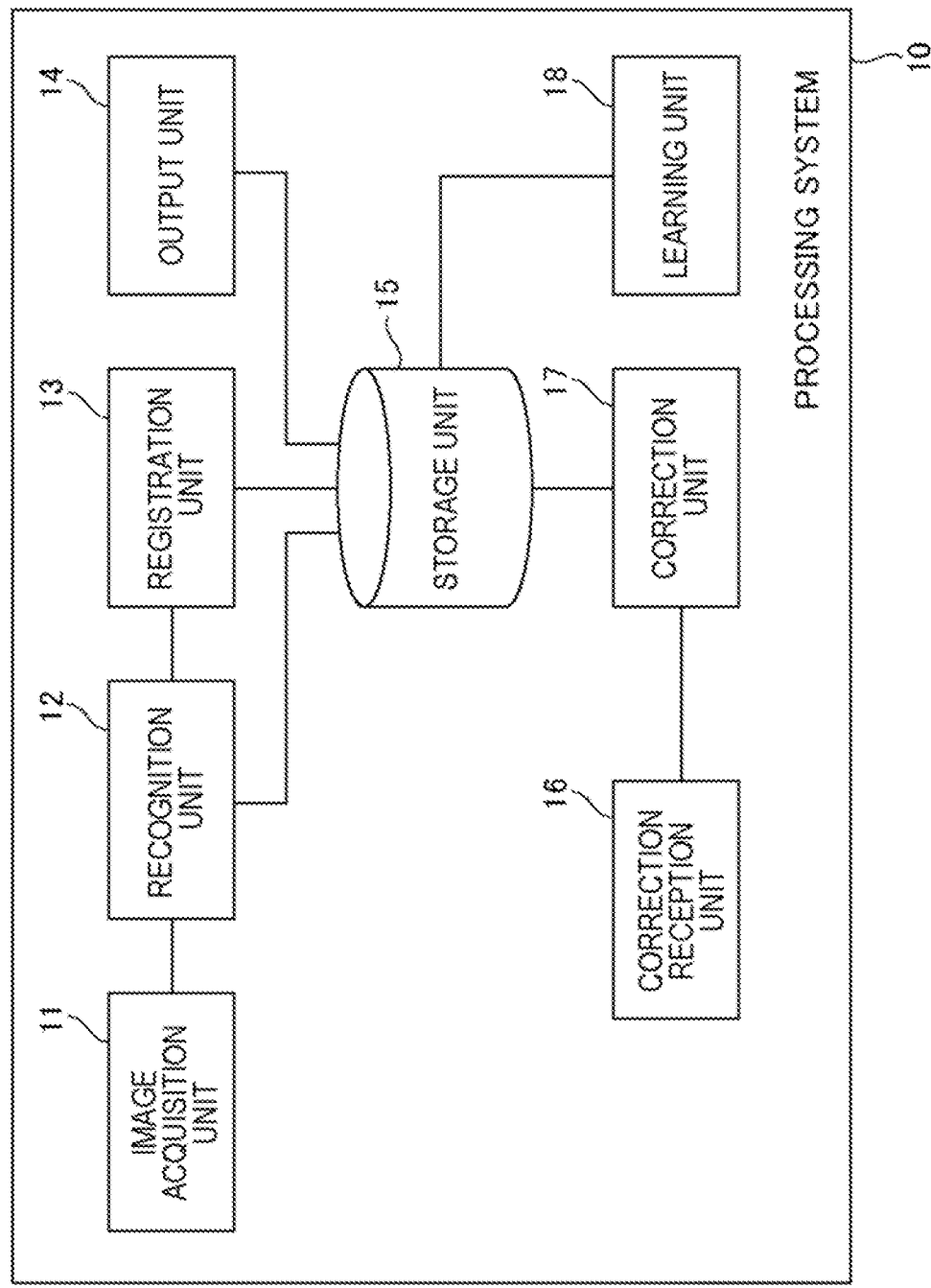
FIG. 4 is one example of a functional block diagram of the processing system according to the present example embodiment.

FIG. 4 illustrates one example of a functional block diagram of the processing system 10 including the accounting apparatus and the server. As illustrated, the processing apparatus 10 includes an image acquisition unit 11, a recognition unit 12, a registration unit 13, an output unit 14, a storage unit 15, a correction reception unit 16, a correction unit 17, and a learning unit 18. For example, the accounting apparatus includes the image acquisition unit 11, the recognition unit 12, the registration unit 13, the output unit 14, the storage unit 15, the correction reception unit 16, and the correction unit 17. Then, the server includes the learning unit 18.

The image acquisition unit 11 acquires a recognition processing image that is an image including a product being a recognition target. The image acquisition unit 11 acquires an image generated by the camera 104 in FIG. 3, for example.

The recognition unit 12 recognizes a product in the recognition processing image, based on an estimation model generated by machine learning, and outputs product identification information (such as a product code) about the recognized product.

The estimation model is, for example, a class classifier to which deep learning is applied. More specifically, the estimation model may be a model to which the technique for recognizing various objects disclosed in Non-Patent Document 1 is applied. The recognition unit 12 recognizes the product in the recognition processing image by inputting the recognition processing image to the estimation model. The recognition processing image input to the estimation model may be an image including the entire recognition processing image, or may be an image acquired by cutting a partial region in which an object in the recognition processing image is detected. For example, in a case of the configuration illustrated in FIG. 3, a plurality of products may be included in one recognition processing image. In this case, for example, the recognition unit 12 performs object recognition processing on the recognition processing image, and then generates a plurality of images acquired by cutting each of object regions detected in the recognition processing image. Then, the recognition unit 12 inputs each of the plurality of cut images to the estimation model, and recognizes each of a plurality of products in the recognition processing image.

For example, a degree of reliability in which an input image includes a product in each of a plurality of classes is output from the estimation model. The recognition unit 12 determines one class, based on a degree of reliability of each of the plurality of classes, and outputs product identification information about the determined class as a result of recognition. For example, the recognition unit 12 may determine a "class having a highest degree of reliability", may determine a "class having a highest degree of reliability and also having the degree of reliability equal to or more than a reference value", may determine one class by combining a degree of reliability with the other parameter, or may determine one class by the other technique.

Returning to FIG. 4, the registration unit 13 registers, in recognized product information, the result of recognition (product identification information) output from the recognition unit 12. The recognized product information according to the present example embodiment is accounting information indicating a product registered as an accounting target.

FIG. 5 schematically illustrates one example of the recognized product information. For example, the storage unit 15 stores the recognized product information.

In the illustrated example, a serial number for identifying a registered product, a product code and a product name being product identification information about the registered product, a unit price of the registered product, and an image file name of a recognition processing image including the registered product are associated with one another.

When the registration unit 13 acquires product identification information output from the recognition unit 12, the registration unit 13 acquires product information (such as a product name, and a unit price) associated with the acquired product identification information from a store server or the like, and registers the product information in the recognized product information as illustrated in FIG. 5. The store server stores a product master in advance.

Further, the registration unit 13 stores, in the storage unit 15, a recognition processing image being a base of a result of each recognition in association with each result of recognition being registered in the recognized product information. The recognition processing image being a base of a result of each recognition is an image input to the estimation model, and is an image including the entire recognition processing image or an image acquired by cutting a partial region in which an object in the recognition processing image is detected.

Returning to FIG. 2, FIG. 4, the output unit 14 outputs the result of recognition to an operator. The output unit 14 can display a list of a plurality of the results of recognition being registered in the recognized product information (see FIG. 5).

FIG. 6 schematically illustrates one example of a screen output from the output unit 14. For example, the screen illustrated in FIG. 6 is displayed on the touch panel display 106 in FIG. 3. Note that, in addition, the output unit 14 may project the screen as illustrated in FIG. 6 in any position via a projection apparatus. A projected position may be a place that can be viewed by an operator who operates the processing system 10.

Returning to FIG. 4, the correction reception unit 16 receives an input for correcting the result of recognition. The correction reception unit 16 receives an input for specifying one from the plurality of results of recognition displayed in the list as illustrated in FIG. 6 or an input for correcting a specified result of recognition. The input for correcting a specified result of recognition is an input of correct product identification information (such as a product code, and a product name). As a means for achieving the inputs, various input apparatuses such as a touch panel, a microphone, a mouse, a keyboard, a physical button, and a code reader can be adopted.

For example, an operator views the screen as illustrated in FIG. 6, and checks whether there is an incorrect recognition result. Then, when there is an incorrect recognition result, an input for specifying the incorrect recognition result and an input of correct product identification information are performed. With a configuration in which correct product identification information can be input via a code reader, an error in an input content can be avoided.

Returning to FIG. 4, the correction unit 17 changes the result of recognition being registered in the recognized product information to the result of recognition after the correction. In other words, the correction unit 17 changes the result of recognition specified by the input being received by the correction reception unit 16 among the results of recognition being registered in the recognized product information, to the correct product identification information indicated by the input being received by the correction reception unit 16.

Further, the correction unit 17 stores, in the storage unit 15, correction information in which the result of recognition after the correction (correct product identification information indicated by the input being received by the correction reception unit 16) and the recognition processing image being a base of the incorrect result of recognition before the correction are associated with each other. The recognition processing image being the base of the incorrect result of recognition before the correction is an image input to the estimation model, and is an image including the entire recognition processing image or an image acquired by cutting a partial region in which an object in the recognition processing image is detected.

FIG. 7 schematically illustrates one example of the correction information. The illustrated correction information accumulates a recognition processing image being a base of an incorrect result of recognition before a correction in association with each product code being a result of recognition after the correction.

Returning to FIG. 4, the learning unit 18 performs relearning by using the recognition processing image stored as the correction information, and updates the estimation model, when the number of the recognition processing images stored as the correction information exceeds a predetermined value (design manner) being predefined. The number of the recognition processing images stored as the correction information is preferably counted for each product (in a case of the example in FIG. 7, for each product code), but may be counted for each product group combining products of the same kind, or may be counted by combining all products.

Figure 8:
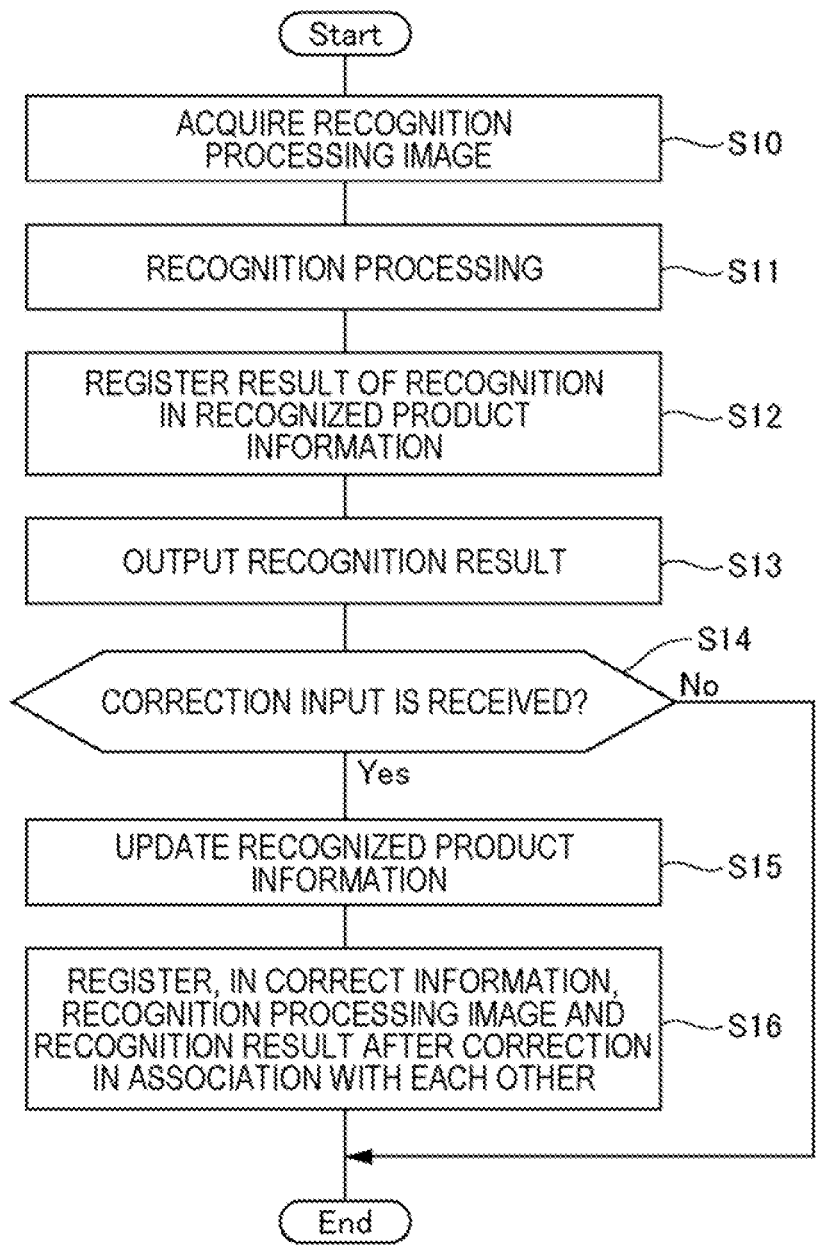
FIG. 8 is a flowchart illustrating one example of a flow of processing of the processing system according to the present example embodiment.

Next, one example of a flow of processing performed by the processing system 10 will be described by using a flowchart in FIG. 8. As described above, the processing system 10 includes the accounting apparatus and the server, but the flowchart in FIG. 8 illustrates one example of a flow of processing performed by the accounting apparatus.

First, the image acquisition unit 11 acquires a recognition processing image including a product being a recognition target (S10). For example, an operator places a product being an accounting target on the product placement area 102 in FIG. 3. Then, the image acquisition unit 11 acquires a recognition processing image that is generated by the camera 104 and includes the product placed on the product placement area 102.

Next, the recognition unit 12 recognizes the product in the recognition processing image acquired in S10, based on an estimation model generated by machine learning (S11). Then, the recognition unit 12 outputs, as a result of recognition, product identification information about the product estimated to be included in the recognition processing image.

Next, the registration unit 13 registers, in recognized product information (see FIG. 5), the result of recognition (product identification information) output from the recognition unit 12 (S12). The recognized product information according to the present example embodiment is accounting information indicating a product registered as an accounting target. Further, the registration unit 13 acquires product information (such as a product name, and a unit price) associated with the acquired product identification information from a store server or the like, and registers the product information in the recognized product information. Further, the registration unit 13 stores, in the storage unit 15, the recognition processing image being a base of the result of each recognition in association with each result of recognition being registered in the recognized product information.

Next, the output unit 14 outputs the result of recognition to an operator (S13). For example, the output unit 14 displays, on the touch panel display 106 in FIG. 3, a screen as illustrated in FIG. 6 displaying a list of a plurality of the results of recognition being registered in the recognized product information (see FIG. 5).

After the result of recognition is output to the operator, the correction reception unit 16 can receive an input for correcting the result of recognition. The correction reception unit 16 receives an input for specifying one from the plurality of results of recognition displayed in the list as illustrated in FIG. 6 or an input for correcting a specified result of recognition. For example, the correction reception unit 16 receives an input for specifying one result of recognition being a correction target via the touch panel display 106 in FIG. 3 displaying the screen as illustrated in FIG. 6. Further, for example, the correction reception unit 16 receives an input of correct product identification information via the code reader 107 in FIG. 3.

Then, when the correction reception unit 16 receives the input for correcting the result of recognition (Yes in S14), the correction unit 17 changes the result of recognition being registered in the recognized product information to the result of recognition after the correction (S15). In other words, the correction unit 17 changes the result of recognition that is a correction target and is specified by the input being received by the correction reception unit 16 among the results of recognition being registered in the recognized product information, to the correct product identification information indicated by the input being received by the correction reception unit 16.

Further, the correction unit 17 stores, in the storage unit 15, correction information in which the result of recognition after the correction (correct product identification information indicated by the input being received by the correction reception unit 16) and the recognition processing image being the base of the incorrect result of recognition before the correction are associated with each other (S16). Note that, a processing order of S15 and S16 is not limited to the illustrated order.

Although not illustrated in the flowchart in FIG. 8, the processing system 10 can receive an instruction input for performing settlement processing at any subsequent timing. For example, the processing system 10 receives the instruction input for performing the settlement processing by receiving an operation of touching a "pay (settle)" button on the screen as illustrated in FIG. 6. In response to the instruction input, the processing system 10 performs the settlement processing, and transmits registered accounting information (such as information about a product being an accounting target, and an accounting amount) to the settlement apparatus that performs the settlement processing.

Further, although not illustrated, the server of the processing system 10 decides whether the number of the recognition processing images stored as the correction information exceeds a predetermined value at a predetermined timing being predefined. Then, when it is decided that the predetermined value is exceeded, the processing system 10 performs relearning by using the recognition processing image stored as the correction information, and updates the estimation model. On the other hand, when it is decided that the predetermined value is not exceeded, the processing system 10 does not perform relearning at that timing. The predetermined timing may be a timing at a time being predefined, may be a timing at which an operator inputs an instruction for performing a decision, or may be other.

Advantageous Effect

The processing system 10 according to the present example embodiment accumulates, as training data, only an "image in which a result of recognition is incorrect" among images input to an estimation model as images (images including a product desired to be recognized) being an analysis target during an actual operation at a store and the like. Then, when the number of pieces of the training data accumulated in such a condition exceeds a predetermined value, the processing system 10 performs relearning, based on the training data that have been accumulated, and updates the estimation model.

Such a processing system 10 can set, as the training data, an image being appropriately narrowed down from all images input to the estimation model as images (images including a product desired to be recognized) being an analysis target during an actual operation at a store and the like, instead of all of the input images, and thus a processing load on a computer required to update the estimation model is reduced.

Further, the processing system 10 according to the present example embodiment can set an "image in which a result of recognition is incorrect" as the training data for relearning, and thus the error is less likely to occur by relearning. In other words, an effect of relearning can be increased.

Further, the processing system 10 performs relearning at a timing at which the number of pieces of accumulated training data exceeds a predetermined value, and thus relearning at a timing at which the number of the pieces of accumulated training data is small and an effect of relearning cannot be sufficiently acquired can be avoided. As a result, a processing load on a computer required to update the estimation model is reduced.

Second Example Embodiment

A processing system 10 according to the present example embodiment has a function of determining, by an image analysis, a correction target among results of recognition displayed in a list. In this way, work of an operator for specifying a correction target can be eliminated. Details will be described below.

A correction reception unit 16 receives an input of correct product identification information as an input for correcting a result of recognition via a code reader. For example, an operator who checks a screen displaying a list of results of recognition as illustrated in FIG. 6 and finds an incorrect recognition result determines a product (product in which a recognition result is incorrect) not being properly registered among accounting targets. Subsequently, the operator inputs correct product identification information about the determined product via the code reader (such as the code reader 107 in FIG. 3).

In the present example embodiment, a camera is installed in a position and an orientation in which the camera captures a scene of work for causing the code reader to read a code provided to a product. The camera may be the same camera as a camera (such as the camera 104 in FIG. 3) that captures a product being an accounting target, or may be a different camera.

An image acquisition unit 11 acquires a correction image being an image generated by the camera that captures a scene of work for causing the code reader to read a code provided to a product.

A correction unit 17 determines, based on the correction image, a correction target among results of recognition being registered in recognized product information. For example, a recognition unit 12 recognizes a product included in the correction image, based on the same estimation model as an estimation model used for recognizing a product in a recognition processing image. Then, the correction unit 17 can determine, as the correction target, a result of recognition that coincides with a result of recognition in the correction image among the results of recognition being registered in the recognized product information.

As another example, the correction unit 17 may determine a correction target, based on a degree of similarity between a feature value of an appearance of a product in a recognition processing image and a feature of an appearance of a product in a correction image. In a case of this example, a result of recognition in the recognition processing image having a highest degree of similarity to the feature of the appearance of the product in the correction image among results of recognition being registered in the recognized product information is determined as the correction target.

The other configuration of the processing system 10 according to the present example embodiment is similar to that in the first example embodiment.

The processing system 10 according to the present example embodiment achieves an advantageous effect similar to that of the processing system 10 according to the first example embodiment. Further, the processing system 10 according to the present example embodiment can automatically determine a correction target by an image analysis, and can thus eliminate work of an operator for specifying a correction target. In this way, a user-friendly configuration is achieved.

As a modification example of the present example embodiment, the processing system 10 may set a correction image as training data. The correction image includes a product in which a result of recognition is incorrect. Such a correction image is set as the training data, and thus the training data about a product in which a result of recognition is incorrect can be efficiently increased.

Third Example Embodiment

Figure 9:
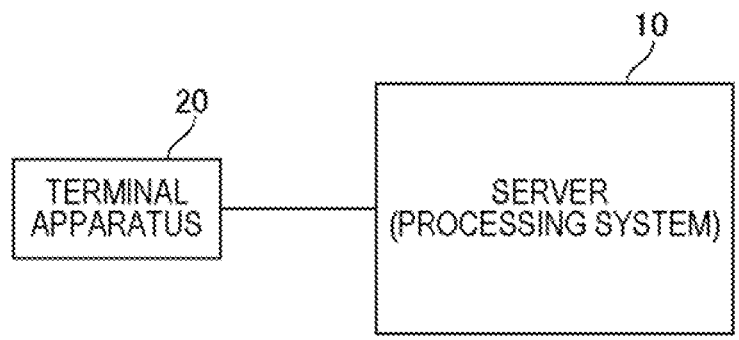
FIG. 9 is one example of a functional block diagram of the processing system according to the present example embodiment.

In the first and second example embodiments, the processing system 10 is the accounting system including the accounting apparatus and the server as illustrated in FIG. 2. A processing system 10 according to the present example embodiment is different from that in the first and second example embodiments, and includes a server that communicates with a terminal apparatus 20 operated by a customer as illustrated in FIG. 9. The processing system 10 outputs a result of recognition and receives an input of a correction of a result of recognition, via the terminal apparatus 20. The terminal apparatus 20 may be a terminal of a customer, such as a smartphone, a tablet terminal, a smartwatch, a cellular phone, and a personal computer (PC), may be a dedicated terminal installed at a store, or may be other.

One example of a functional block diagram of the processing system 10 according to the present example embodiment is illustrated in FIG. 4 similarly to that in the first and second example embodiments.

In the present example embodiment, a camera is installed in a store in a position and an orientation in which the camera captures a scene in which a customer takes out a product from a product shelf. The camera may be installed on a product shelf, may be installed on a ceiling, may be installed on a floor, may be installed on a wall, and may be installed at the other place.

Further, the camera that captures a scene in which a customer takes out a product from one product shelf may be one, or may be a plurality of cameras. When a plurality of cameras capture a scene in which a customer takes out a product from one product shelf, the plurality of cameras are preferably installed in such a way as to capture the scene in which the customer takes out the product from the product shelf in positions and directions different from each other.

Further, the camera may be installed for each product shelf, the camera may be installed for each of a plurality of product shelves, the camera may be installed for each row of a product shelf, or the camera may be installed for each of a plurality of rows of a product shelf.

The camera may capture a moving image at all times (for example, during business hours), may continuously capture a still image at a time interval longer than a frame interval of a moving image, or may perform the capturing only while a human sensor or the like detects a person present in a predetermined position (in front of a product shelf, or the like).

Figure 10:
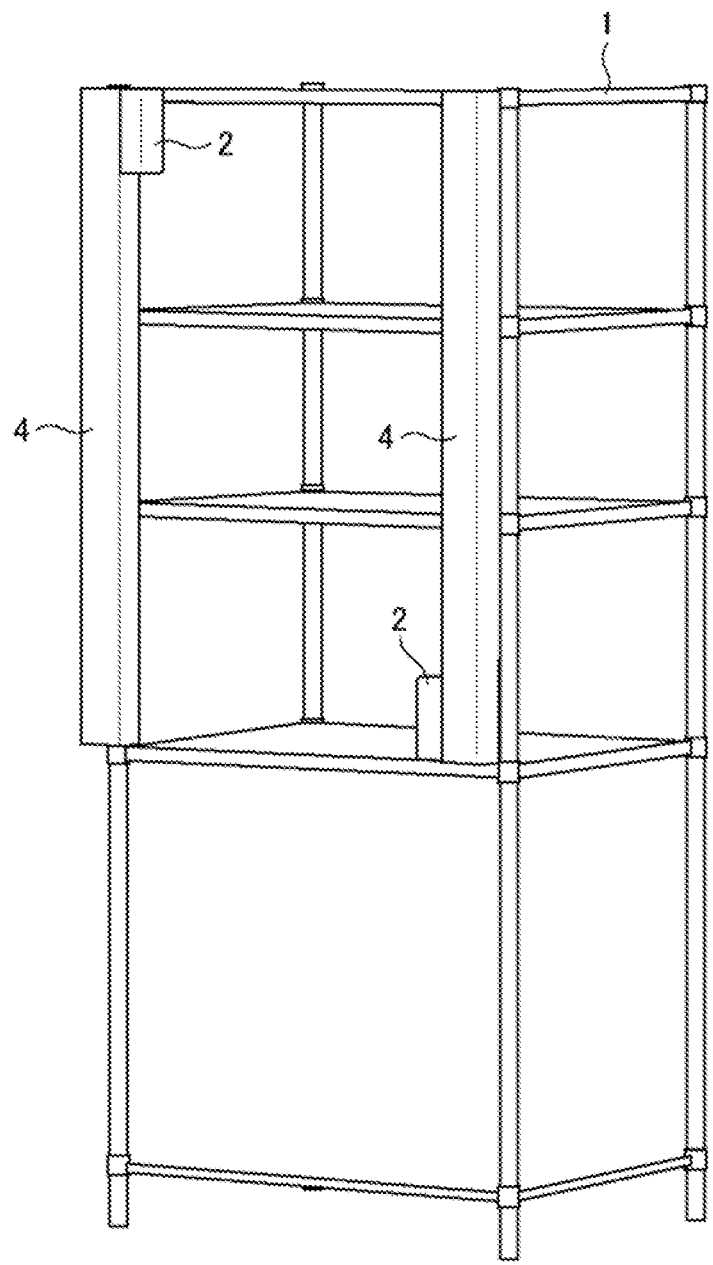
FIG. 10 is a diagram for describing an installation example of a camera according to the present example embodiment.
Figure 11:
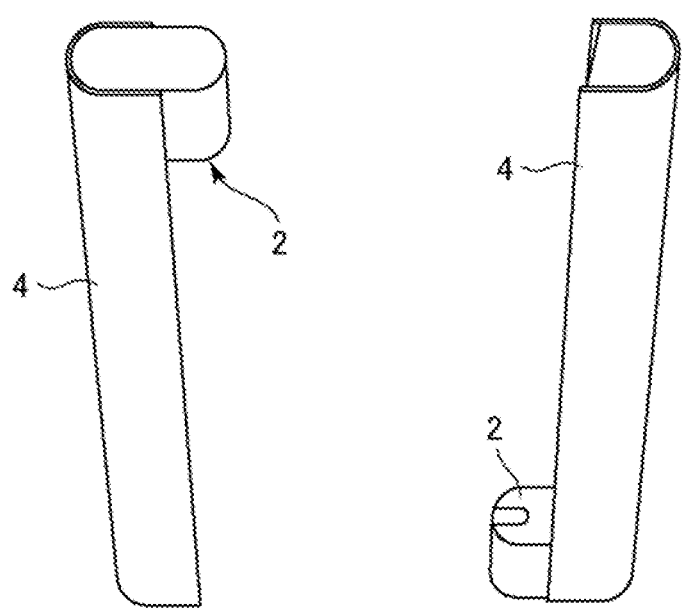
FIG. 11 is a diagram for describing an installation example of the camera according to the present example embodiment.

Herein, one example of camera installation is exemplified. Note that, the camera installation example described herein is merely one example, which is not limited thereto. In an example illustrated in FIG. 10, two cameras 2 are installed for each product shelf 1. FIG. 11 is a diagram in which a frame 4 in FIG. 10 is extracted. Each of two parts constituting the frame 4 is provided with the camera 2 and illumination (not illustrated).

A light radiation surface of the illumination extends in one direction, and includes a light emission portion and a cover that covers the light emission portion. The illumination radiates light mainly in a direction orthogonal to the extending direction of the light radiation surface. The light emission portion includes a light emitting element such as an LED, and radiates light in a direction not being covered by the cover. Note that, when the light emitting element is an LED, a plurality of LEDs are aligned in a direction (up-down direction in the diagram) in which the illumination extends.

Then, the camera 2 is provided on one end side of the part of the frame 4 extending linearly, and has a capturing range in the direction in which light of the illumination is radiated. For example, in the part of the frame 4 on a left side in FIG. 11, the camera 2 has a lower area and a diagonally lower right area as the capturing range. Further, in the part of the frame 4 on a right side in FIG. 11, the camera 2 has an upper area and a diagonally upper left area as the capturing range.

As illustrated in FIG. 10, the frame 4 is attached to a front frame (or a front surface of a side wall on each of both sides) of the product shelf 1 constituting a product placement space. One of the parts of the frame 4 is attached to one of the front frames in an orientation in which the camera 2 is located below. The other part of the frame 4 is attached to the other front frame in an orientation in which the camera 2 is located above. Then, the camera 2 attached to one of the parts of the frame 4 captures an upper area and a diagonally upper area in such a way as to include an opening of the product shelf 1 in the capturing range. On the other hand, the camera 2 attached to the other part of the frame 4 captures a lower area and a diagonally lower area in such a way as to include the opening of the product shelf 1 in the capturing range. With such a configuration, the two cameras 2 can capture an entire range of the opening of the product shelf 1.

The image acquisition unit 11 illustrated in FIG. 4 acquires a recognition processing image generated by such a camera. The recognition processing image may be input to the processing system 10 by real time processing, or may be input to the processing system 10 by batch processing. Which processing to be performed can be determined according to a usage content of a result of recognition, for example.

A configuration of an acquisition unit 12 and a registration unit 13 is similar to that in the first example embodiment. Note that, the registration unit 13 may register at least a result of recognition and a recognition processing image being a base of the result of recognition in association with each other, and registration of information such as a product name and a unit price being acquired from a store server is not necessarily essential. Whether to register information acquired from the store server can be selected according to a usage content of a result of recognition.

An output unit 14 outputs a result of recognition to a customer via the terminal apparatus 20. For example, similarly to the first and second example embodiments, the output unit 14 displays, on the terminal apparatus 20, a screen displaying a list of results of recognition as illustrated in FIG. 6. Then, a correction reception unit 16 receives an input for correcting a result of recognition via the terminal apparatus 20. A specific example will be described below.

SPECIFIC EXAMPLE 1

The processing system 10 recognizes a product held by a customer with a hand by the configuration described above, and also identifies the customer holding the product with the hand by any means. Then, the processing system 10 registers, in association with customer identification information about the customer, recognized product information (result of recognition) as illustrated in FIG. 5. For example, the means for identifying a customer may be achieved by face recognition processing based on a face image of a customer being captured by a camera installed in a store, or may be achieved by the other means.

Then, the output unit 14 outputs a result of recognition via the terminal apparatus 20 of each customer. Further, the correction reception unit 16 receives an input for correcting a result of recognition via the terminal apparatus 20 of each customer. For example, each customer accesses the processing system 10 via a predetermined application installed in the terminal apparatus 20, and logs in by using customer identification information about himself/herself. Then, the processing system 10 determines the terminal apparatus 20 of each customer, based on log-in information, and outputs a result of recognition associated with each customer and receives an input for correcting a result of recognition, via the determined terminal apparatus 20 of each customer.

SPECIFIC EXAMPLE 2

The processing system 10 recognizes a product held by a customer with a hand by the configuration described above, and also identifies the customer holding the product with the hand by any means. Then, the processing system 10 registers, in association with customer identification information about the customer, recognized product information (result of recognition) as illustrated in FIG. 5. For example, the means for identifying a customer may be achieved by face recognition processing based on a face image of a customer being captured by a camera installed in a store, or may be achieved by the other means.

Then, the output unit 14 outputs a result of recognition via the terminal apparatus 20 installed at a store. Further, the correction reception unit 16 receives an input for correcting a result of recognition via the terminal apparatus 20 installed at the store. The terminal apparatus 20 installed at the store may be an accounting apparatus such as a point of sale (POS) register, or may be other.

For example, when a customer performs accounting processing, the customer inputs customer identification information about himself/herself to the terminal apparatus 20 installed at the store. For example, the customer may achieve the input by capturing a face of himself/herself. In this case, the customer identification information is determined by face recognition processing based on a captured face image of the customer. In addition, the customer may achieve the input by bringing, into a communicable state, a reader that performs short-range wireless communication and a device (such as a smartphone, a smartwatch, a tablet terminal, a cellular phone, and an IC card) that stores the customer identification information. In addition, the customer may input the customer identification information via an input apparatus such as a touch panel, a microphone, a keyboard, and a mouse.

When the processing system 10 acquires the customer identification information from the terminal apparatus 20 installed at the store, the processing system 10 transmits a result of recognition associated with the customer identification information to the terminal apparatus 20, and displays the result of recognition on the terminal apparatus 20. Further, the processing system 10 receives an input for correcting a result of recognition associated with the customer identification information via the terminal apparatus 20.

Specific Example 3

When the processing system 10 recognizes a product held by a customer with a hand by the configuration described above, the processing system 10 registers, in association with a face image of the customer holding the product with the hand and/or a feature value extracted from the face image, recognized product information (result of recognition) as illustrated in FIG. 5.

Then, the output unit 14 outputs a result of recognition via the terminal apparatus 20 installed at a store. Further, the correction reception unit 16 receives an input for correcting a result of recognition via the terminal apparatus 20 installed at the store. The terminal apparatus 20 installed at the store may be an accounting apparatus such as a POS register, or may be other.

For example, when a customer performs accounting processing, the customer causes the terminal apparatus 20 installed at the store to capture a face of himself/herself. When the processing system 10 acquires a face image of the customer from the terminal apparatus 20 installed at the store, the processing system 10 transmits a result of recognition associated with the acquired face image or a feature value extracted from the face image to the terminal apparatus 20, and displays the result of recognition on the terminal apparatus 20. Further, the processing system 10 receives an input for correcting a result of recognition associated with the acquired face image or a feature value extracted from the face image via the terminal apparatus 20.

Returning to FIG. 4, a configuration of a storage unit 15, a correction unit 17, and a learning unit 18 is similar to that in the first and second example embodiments.

The processing system 10 according to the present example embodiment achieves an advantageous effect similar to that in the first and second example embodiments. Further, the processing system 10 according to the present example embodiment can achieve generation of a recognition processing image, an output of a result of recognition, and an input for correcting a result of recognition by a technique different from that in the first and second example embodiments. As a result, a usage scene of the processing system 10 is widened, which is preferable.

Note that, in the present specification, "acquisition" includes at least any one of "acquisition of data stored in another apparatus or a storage medium by its own apparatus (active acquisition)", based on a user input or an instruction of a program, such as reception by making a request or an inquiry to another apparatus and reading by accessing to another apparatus or a storage medium, "inputting of data output to its own apparatus from another apparatus (passive acquisition)", based on a user input or an instruction of a program, such as reception of data to be distributed (transmitted, push-notified, or the like) and acquisition by selection from among received data or received information, and "generation of new data by editing data (such as texting, sorting of data, extraction of a part of data, and change of a file format) and the like, and acquisition of the new data".

The invention of the present application is described above with reference to the example embodiments (examples), but the invention of the present application is not limited to the example embodiments (examples) described above. Various modifications that can be understood by those skilled in the art can be made to the configuration and the details of the invention of the present application within the scope of the invention of the present application.

A part or the whole of the above-described example embodiments may also be described as in supplementary notes below, which is not limited thereto.

1. A processing system, including:
    an image acquisition unit that acquires a recognition processing image including a product being a recognition target;
    a recognition unit that recognizes a product in the recognition processing image, based on an estimation model generated by machine learning;
    a registration unit that registers a result of the recognition in recognized product information;
    an output unit that outputs a result of the recognition;
    a correction reception unit that receives an input for correcting a result of the recognition;
    a correction unit that changes a result of the recognition being registered in the recognized product information to a result of the recognition after a correction, and also stores, in a storage unit, correction information in which a result of the recognition after a correction and the recognition processing image are associated with each other; and
    a learning unit that performs relearning by using the recognition processing image stored as the correction information and updating the estimation model, when a number of the recognition processing image stored as the correction information exceeds a predetermined value.

2. The processing system according to supplementary note 1, wherein
    the output unit displays a list of a plurality of results of the recognition being registered in the recognized product information, and
    the correction reception unit receives an input for specifying one from a plurality of results of the recognition displayed in a list and an input for correcting a specified result of the recognition.

3. The processing system according to supplementary note 1 or 2, wherein
    the correction reception unit receives an input of correct product identification information as an input for correcting a result of the recognition.

4. The processing system according to supplementary note 3, wherein
    the correction reception unit receives an input of correct product identification information via a code reader.

5. The processing system according to supplementary note 2, wherein
    the correction reception unit receives an input of correct product identification information as an input for correcting a result of the recognition via a code reader,
    the image acquisition unit further acquires a correction image indicating a scene of work for causing the code reader to read product identification information provided to a product, and
    the correction unit determines, based on the correction image, a correction target among results of the recognition being registered in the recognized product information.

6. The processing system according to supplementary note 5, wherein
    the recognition unit recognizes a product in the correction image, based on the estimation model, and
    the correction unit determines, as a correction target, a result of the recognition that coincides with a result of recognition in the correction image among results of the recognition being registered in the recognized product information.

7. The processing system according to supplementary note 5, wherein
    the correction unit determines a correction target, based on a degree of similarity between a feature value of an appearance of a product in the correction image and a feature value of an appearance of a product in the recognition processing image.

8. A processing method, including,
by a computer:
    acquiring a recognition processing image including a product being a recognition target;
    recognizing a product in the recognition processing image, based on an estimation model generated by machine learning;

registering a result of the recognition in recognized product information;

outputting a result of the recognition;

receiving an input for correcting a result of the recognition;

changing a result of the recognition being registered in the recognized product information to a result of the recognition after a correction, and also storing, in a storage unit, correction information in which a result of the recognition after a correction and the recognition processing image are associated with each other; and performing relearning by using the recognition processing image stored as the correction information and updating the estimation model, when a number of the recognition processing image stored as the correction information exceeds a predetermined value.

9. A program causing a computer to function as:

an image acquisition unit that acquires a recognition processing image including a product being a recognition target;

a recognition unit that recognizes a product in the recognition processing image, based on an estimation model generated by machine learning;

a registration unit that registers a result of the recognition in recognized product information;

an output unit that outputs a result of the recognition;

a correction reception unit that receives an input for correcting a result of the recognition;

a correction unit that changes a result of the recognition being registered in the recognized product information to a result of the recognition after a correction, and also stores, in a storage unit, correction information in which a result of the recognition after a correction and the recognition processing image are associated with each other; and a learning unit that performs relearning by using the recognition processing image stored as the correction information and updating the estimation model, when a number of the recognition processing image stored as the correction information exceeds a predetermined value.

What is claimed is:

1. A processing system, comprising:
at least one memory configured to store one or more instructions; and
at least one processor configured to execute the one or more instructions to:
acquire a recognition processing image including a product being a recognition target;
recognize a product in the recognition processing image, based on an estimation model generated by machine learning;
register a result of the recognition in recognized product information;
output a result of the recognition;
receive an input for correcting a result of the recognition;
change a result of the recognition being registered in the recognized product information to a result of the recognition after a correction, and also store, in storage unit, correction information in which a result of the recognition after a correction and the recognition processing image are associated with each other; and
perform relearning by using the recognition processing image stored as the correction information and updating the estimation model, when a number of the recognition processing image stored as the correction information exceeds a predetermined value.

2. The processing system according to claim 1, wherein the processor is further configured to execute the one or more instructions to:
display a list of a plurality of results of the recognition being registered in the recognized product information, and
receive an input for specifying one from a plurality of results of the recognition displayed in a list, and an input for correcting a specified result of the recognition.

3. The processing system according to claim 2, wherein the processor is further configured to execute the one or more instructions to:
receive an input of correct product identification information as an input for correcting a result of the recognition via a code reader,
acquire a correction image indicating a scene of work for causing the code reader to read product identification information provided to a product, and
determine, based on the correction image, a correction target among results of the recognition being registered in the recognized product information.

4. The processing system according to claim 3, wherein the processor is further configured to execute the one or more instructions to:
recognize a product in the correction image, based on the estimation model, and
determine, as a correction target, a result of the recognition that coincides with a result of recognition in the correction image among results of the recognition being registered in the recognized product information.

5. The processing system according to claim 3, wherein the processor is further configured to execute the one or more instructions to determine a correction target, based on a degree of similarity between a feature value of an appearance of a product in the correction image and a feature value of an appearance of a product in the recognition processing image.

6. The processing system according to claim 1, wherein the processor is further configured to execute the one or more instructions to receive an input of correct product identification information as an input for correcting a result of the recognition.

7. The processing system according to claim 6, wherein the processor is further configured to execute the one or more instructions to receive an input of correct product identification information via a code reader.

8. A processing method, comprising,
by a computer:
acquiring a recognition processing image including a product being a recognition target;
recognizing a product in the recognition processing image, based on an estimation model generated by machine learning;
registering a result of the recognition in recognized product information;
outputting a result of the recognition;
receiving an input for correcting a result of the recognition;
changing a result of the recognition being registered in the recognized product information to a result of the recognition after a correction, and also storing, in storage unit, correction information in which a result of the recognition after a correction and the recognition processing image are associated with each other; and
performing relearning by using the recognition processing image stored as the correction information and updating the estimation model, when a number of the recognition processing image stored as the correction information exceeds a predetermined value.

9. A non-transitory storage medium storing a program causing a computer to:
acquire a recognition processing image including a product being a recognition target;
recognize a product in the recognition processing image, based on an estimation model generated by machine learning;
register a result of the recognition in recognized product information;
output a result of the recognition;
receive an input for correcting a result of the recognition;
change a result of the recognition being registered in the recognized product information to a result of the recognition after a correction, and also store, in storage unit, correction information in which a result of the recognition after a correction and the recognition processing image are associated with each other; and
perform relearning by using the recognition processing image stored as the correction information and updating the estimation model, when a number of the recognition processing image stored as the correction information exceeds a predetermined value.

* * * * *